United States Patent
Yamamoto

(10) Patent No.: US 12,262,337 B2
(45) Date of Patent: Mar. 25, 2025

(54) COMMUNICATION APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventor: Tetsuya Yamamoto, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 457 days.

(21) Appl. No.: 17/861,531

(22) Filed: Jul. 11, 2022

(65) Prior Publication Data

US 2023/0028156 A1     Jan. 26, 2023

(30) Foreign Application Priority Data

Jul. 20, 2021 (JP) .................. 2021-119870

(51) Int. Cl.
*H04W 56/00* (2009.01)
*H04W 76/10* (2018.01)
*H04W 76/27* (2018.01)

(52) U.S. Cl.
CPC ......... *H04W 56/001* (2013.01); *H04W 76/10* (2018.02); *H04W 76/27* (2018.02)

(58) Field of Classification Search
CPC ... H04W 56/001; H04W 76/10; H04W 76/27; Y02D 30/70
See application file for complete search history.

(56) References Cited

U.S. PATENT DOCUMENTS

| | | | |
|---|---|---|---|
| 10,004,020 B2 | 6/2018 | Yamamoto | |
| 11,290,896 B2* | 3/2022 | Malladi | H04W 52/0206 |
| 2022/0352999 A1* | 11/2022 | Bowler | H04J 3/0641 |
| 2022/0400491 A1 | 12/2022 | Yamamoto | |

FOREIGN PATENT DOCUMENTS

| | | | |
|---|---|---|---|
| JP | 2002-300175 A | 10/2002 | |
| JP | 2003-110562 A | 4/2003 | |

* cited by examiner

*Primary Examiner* — Kyaw Z Soe
(74) *Attorney, Agent, or Firm* — Carter, DeLuca & Farrell LLP

(57) ABSTRACT

A communication apparatus performs, during establishment of connection with a base station, synchronization processing for obtaining reference time information of a time synchronization system and establishing time synchronization, sets a time interval for performing the synchronization processing based on an error of an intra-apparatus time held in the communication apparatus with respect to time information represented by the reference time information, and in a non-connected state, based on the time interval, requests the base station to cause the communication apparatus to transition to a connected state at a timing when the synchronization processing should be performed, wherein the synchronization processing is performed at a timing based on the time interval, at which the communication apparatus is operating in the connected state.

14 Claims, 6 Drawing Sheets

FIG. 5

| OBTAINED SYNCHRONIZATION ERROR | SYNCHRONIZATION TIME INTERVAL |
|---|---|
| 15 MICROSECONDS OR MORE | 1 SECOND |
| 5 MICROSECONDS OR MORE LESS THAN 15 MICROSECONDS | 3 SECONDS |
| LESS THAN 5 MICROSECONDS | 10 SECONDS |

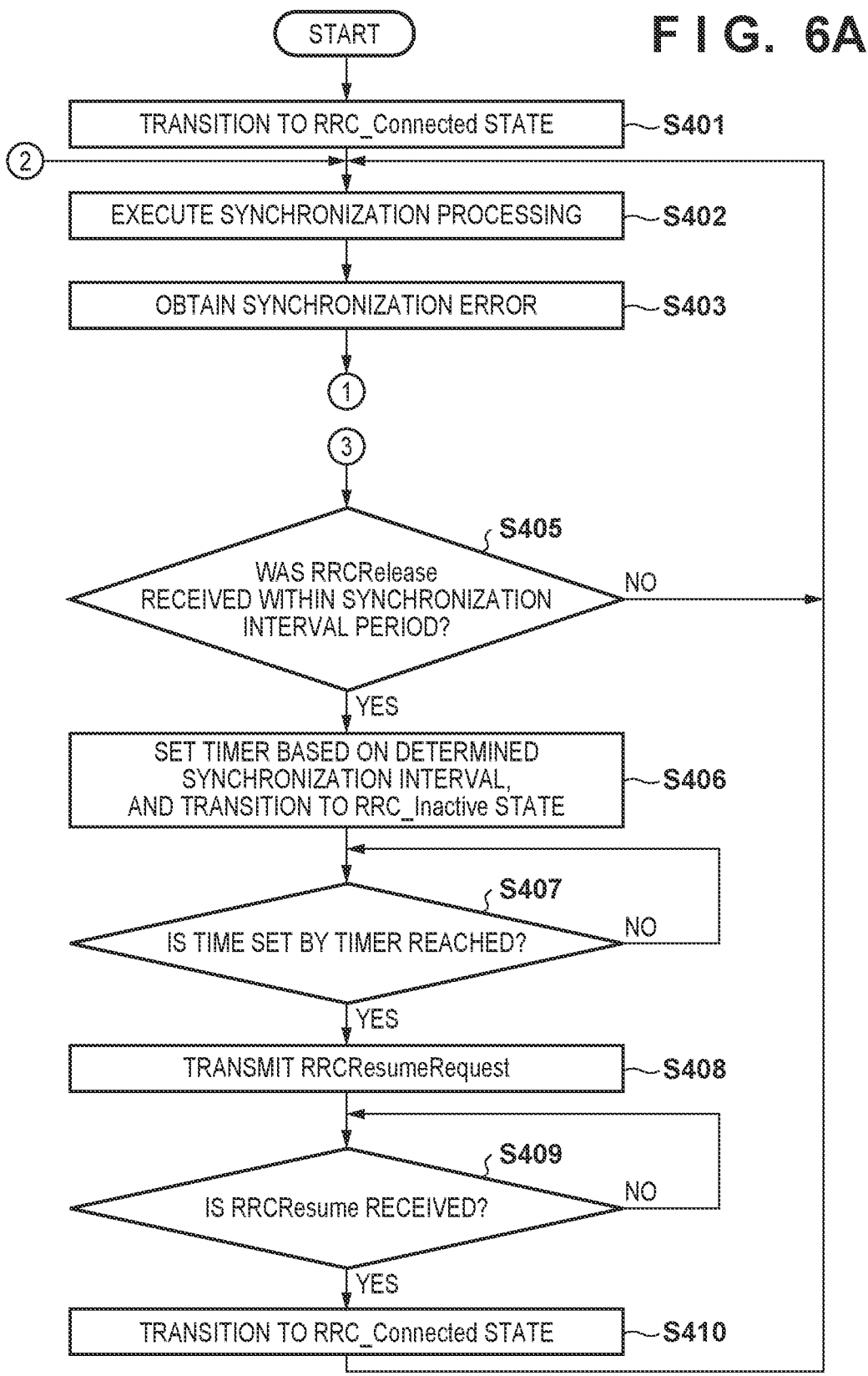

COMMUNICATION APPARATUS, CONTROL METHOD, AND NON-TRANSITORY COMPUTER-READABLE STORAGE MEDIUM

BACKGROUND OF THE INVENTION

Field of the Invention

The present invention relates to a time synchronization technique using a wireless communication network.

Description of the Related Art

In an electronic device, it is useful to establish time synchronization to control the operation of the electronic device or provide a service to the electronic device. Japanese Patent Laid-Open No. 2003-110562 describes a technique of establishing time synchronization by inquiring of a server about a time and receiving a response. According to the technique described in Japanese Patent Laid-Open No. 2003-110562, if a time synchronization error is a predetermined value or less, the reception interval of a time synchronization signal is made long, thereby reducing the load of the server and efficiently establishing time synchronization.

Some electronic devices may not be able to always connect to a server. For example, Japanese Patent Laid-Open No. 2002-300175 describes that for power saving of a communication apparatus, the communication apparatus is notified of a scheduled data transmission time and powered off during a time in which no data is transmitted. Such a communication apparatus is not activated if data addressed to the self-apparatus is absent. Hence, it is impossible to perform a procedure for obtaining a time synchronization signal during that time.

SUMMARY OF THE INVENTION

The present invention provides an efficient time synchronization establishing technique in a communication apparatus that is not in an always connected state.

According to one aspect of the present invention, there is provided a communication apparatus for performing wireless communication by switching between a connected state in which connection is established and a non-connected state in which connection is not established based on control of a base station, comprising: one or more processors, and one or more memories that store a program for causing, when executed by the one or more processors, the communication apparatus to: perform, during establishment of connection with the base station, synchronization processing for obtaining reference time information of a time synchronization system and establishing time synchronization; set a time interval for performing the synchronization processing based on an error of an intra-apparatus time held in the communication apparatus with respect to time information represented by the reference time information; and in a case where the communication apparatus is operating in the non-connected state, based on the time interval, request the base station to cause the communication apparatus to stay in the connected state at a timing when the synchronization processing is to be performed, wherein the synchronization processing is performed at a timing based on the time interval, at which the communication apparatus is operating in the connected state.

Further features of the present invention will become apparent from the following description of exemplary embodiments with reference to the attached drawings.

BRIEF DESCRIPTION OF THE DRAWINGS

FIG. 5 is a table showing an example of the relationship between a synchronization error and an execution time interval of synchronization processing; and FIGS. 6A and 6B show a flowchart showing the second example of the procedure of processing executed by the communication apparatus.

DESCRIPTION OF THE EMBODIMENTS

Figure 1:
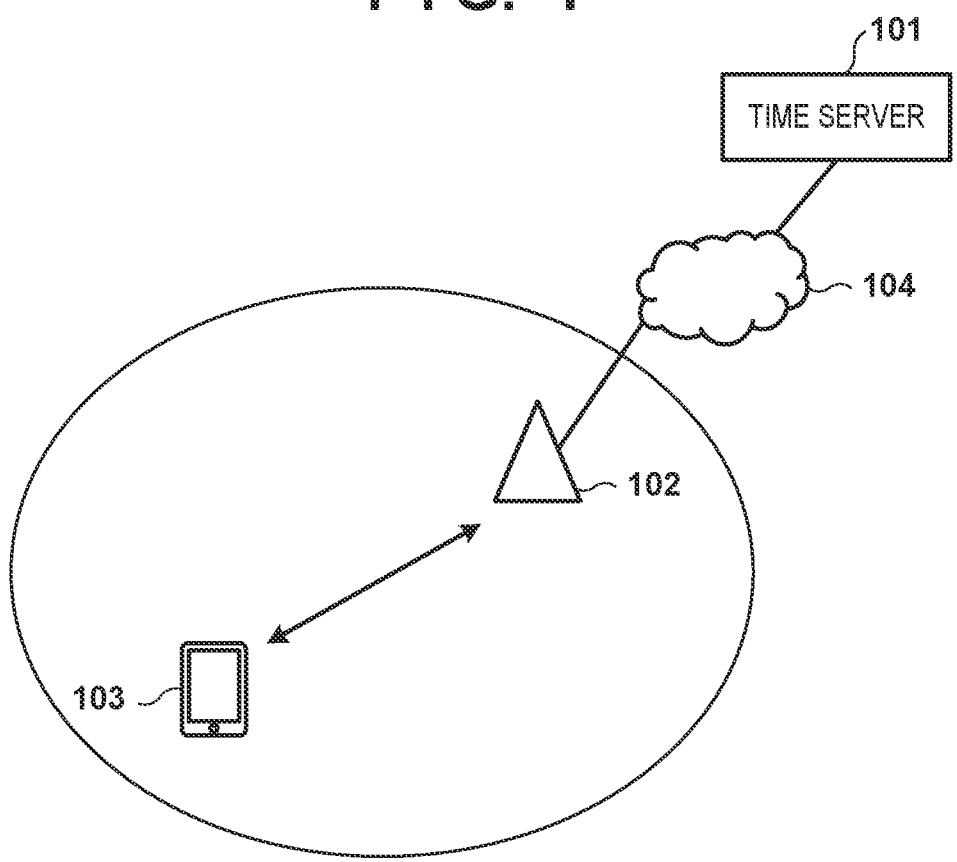
FIG. 1 is a view showing an example of the configuration of a time synchronization system.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

(System Configuration)

FIG. 1 shows an example of the configuration of a time synchronization system according to this embodiment. This system is configured such that a time server 101 distributes reference time information, and an electronic device synchronizes time with the time server 101. The time server 101 can operate as a grandmaster complying with, for example, the Institute of Electrical and Electronics Engineers (IEEE) 1588 standard. In this embodiment, a communication apparatus 103 that can be connected to a base station 102 in a cellular communication network establishes time synchronization with the time server 101. The base station 102 is abase station in the cellular communication network and is configured to perform communication complying with a cellular communication standard by, for example, 3GPP (Third Generation Partnership Project) such as LTE (Long Term Evolution) or 5G (Fifth Generation). Note that the cellular communication standard by 3GPP will be referred to as "3GPP standard" hereinafter. The communication apparatus 103 is a terminal apparatus complying with a cellular communication standard such as LTE or 5G, and is configured to, for example, establish connection with the base station 102 and perform wireless communication. Note that FIG. 1 shows an example in which the base station 102 (and the communication apparatus 103) and the time server 101 are connected via an external network 104. However, the present invention is not limited to this. For example, the time server 101 may be arranged in the cellular communication network or may be included in the base station 102.

The communication apparatus 103, for example, periodically receives reference time information from the time server 101 and corrects the time as needed such that the error between the reference time and an intra-apparatus time held in the self-apparatus becomes sufficiently small. At this time, the communication apparatus 103 can adjust the frequency for obtaining the reference time information and executing synchronization processing based on, for example, the magnitude of the error between the reference time and the intra-apparatus time. For example, if the error between the reference time and the intra-apparatus time is a predetermined value or less, the communication apparatus 103 can relatively lower the synchronization processing execution frequency. If the error exceeds the predetermined value, the communication apparatus 103 can relatively raise the synchronization processing execution frequency. On the other hand, the communication apparatus 103 cannot obtain the reference time information from the time server 101 unless connection with the base station 102 is established. Hence, the communication apparatus 103 may be unable to obtain the reference time information at a timing when synchronization processing should be executed.

Considering such a situation, this embodiment provides a method of allowing the communication apparatus 103 to execute synchronization processing at an appropriate timing. After a description of the configuration of the communication apparatus 103, an example of the procedure of processing executed by the communication apparatus 103 will be described below.

(Configuration of Apparatus)

Figure 2:
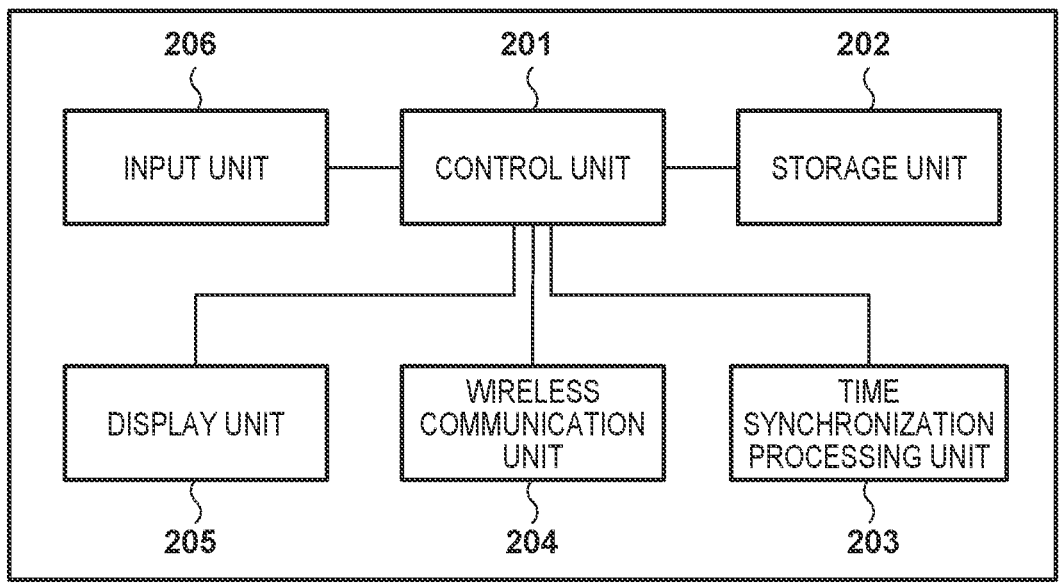
FIG. 2 is a block diagram showing an example of the hardware configuration of a communication apparatus.

FIG. 2 shows an example of the hardware configuration of the communication apparatus 103. Note that FIG. 2 shows an example of a part of the hardware configuration of the communication apparatus 103, and the communication apparatus 103 can have a hardware configuration other than that shown in FIG. 2, as a matter of course. Also, the communication apparatus 103 may not have at least a part of the hardware configuration shown in FIG. 2. Furthermore, the communication apparatus 103 may include one device formed by combining two or more of blocks shown in FIG. 2, or may include a plurality of devices that cooperatively implement one block. The communication apparatus 103 includes, for example, a control unit 201, a storage unit 202, a time synchronization processing unit 203, a wireless communication unit 204, a display unit 205, and an input unit 206.

The control unit 201 controls the entire communication apparatus 103 by executing a control program stored in the storage unit 202. The control unit 201 is configured to include, for example, at least one processor such as a CPU (Central Processing Unit) or an MPU (Micro Processing Unit). Note that in place of or in addition to this, the control unit 201 may include, for example, an FPGA (Field Programmable Gate Array), a DSP (Digital Signal Processor), or an ASIC (Application Specific Integrated Circuit). The storage unit 202 stores various kinds of information such as control programs to be executed by the control unit 201, communication parameters, and image data obtained by image capturing. Various kinds of operations to be described later can be implemented by, for example, the control unit 201 reading out control programs stored in the storage unit 202 and executing. The storage unit 202 is configured to include, for example, at least one memory such as a ROM (Read Only Memory) or a RAM (Random Access Memory). Note that this is merely an example, and the storage unit 202 may include, for example, a mass storage device such as a hard disk drive (HDD), or may include another storage medium. The storage unit 202 may be formed by a detachable storage device.

The time synchronization processing unit 203 executes time synchronization processing complying with the IEEE1588 standard. The time synchronization processing unit 203 holds, for example, an internal clock and is configured to adjust the internal clock based on the reference time information obtained from the time server 101. Also, the time synchronization processing unit 203 may hold an internal timer configured to determine the timing to execute synchronization processing. The wireless communication unit 204 performs communication complying with a cellular communication standard such as the LTE or 5G standard of the 3GPP. The wireless communication unit 204 is configured to include, for example, a baseband chip, a radio frequency (RF) chip, and an antenna. The wireless communication unit 204 performs communication with the base station 102 based on, for example, the control by the control unit 201. Note that the wireless communication unit 204 executes wireless communication to establish connection with the base station 102 based on the control of the base station 102. For example, under the control of the base station 102, the wireless communication unit 204 transitions to an RRC_Connected state that is a connected state in which connection of a layer under an RRC layer such as an RRC (Radio Resource Control) layer or a physical layer is established, and performs communication with the base station 102. In addition, under the control of the base station 102, the wireless communication unit 204 transitions to a non-connected state in the lower layer while the context of RRC and the like is held in the base station 102 or a core network, thereby operating in an RRC_Inactive state in which power consumption is suppressed. Also, under the control of the base station 102, the wireless communication unit 204 can operate in an RRC_Idle state that is a non-connected state in which the context of RRC and the like is discarded. In a state in which communication with the communication apparatus 103 is not performed, the base station 102 makes the communication apparatus 103 transition to the RRC_Inactive state or RRC_Idle state, thereby reducing the power consumption of the communication apparatus 103. Note that when the RRC_Inactive state is used, it is possible to quickly connect the communication apparatus 103 to the network at the time of returning to communication while achieving power saving by suppressing the control signal to the communication apparatus 103.

The display unit 205 is configured to include at least one of an LCD (Liquid Crystal Display) or an LED (Light-Emitting Diode) configured to output visually recognizable information, a speaker for enabling audible recognition, and a vibration element for enabling tactual recognition. Note that these are merely examples, and an arbitrary device for allowing the user of the communication apparatus 103 to recognize information is used as the display unit 205. The input unit 206 is configured to include a keyboard or a touch panel configured to accept information input by a user operation, and a sensor configured to output an environment observation result, and receives information from the outside. Note that the display unit 205 and the input unit 206 may be implemented by an integrated device using a touch panel display or the like.

Figure 3:
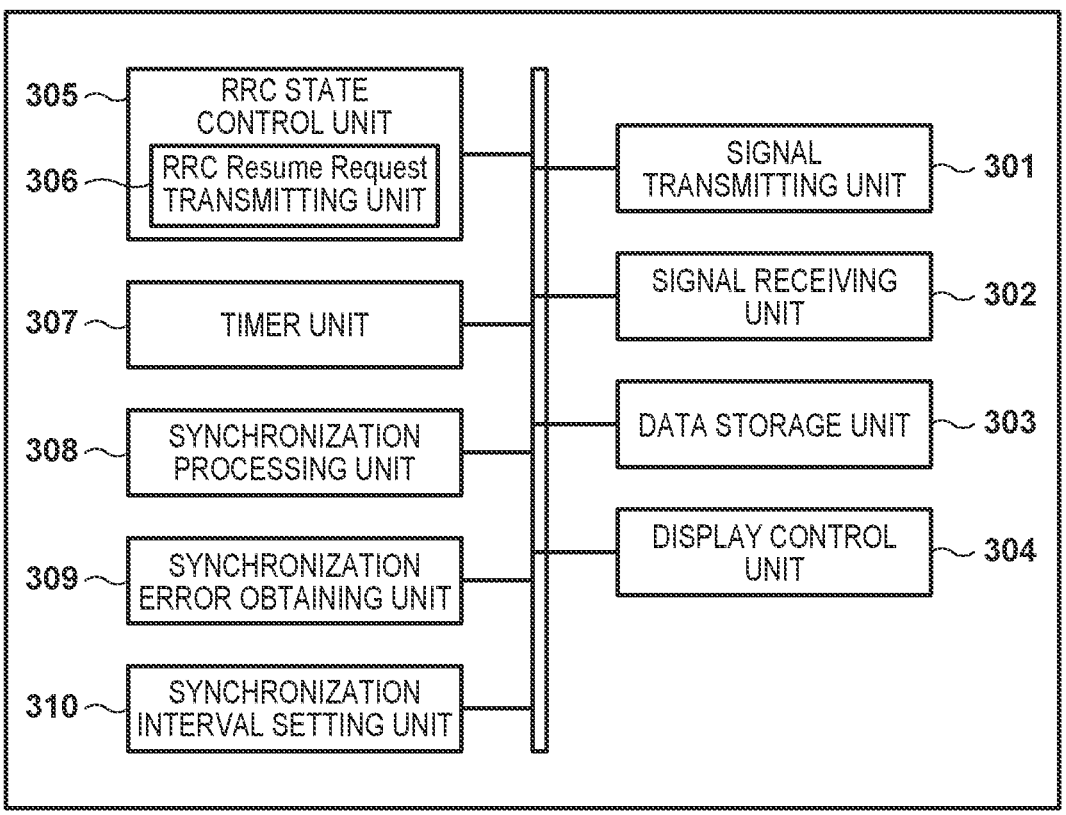
FIG. 3 is a block diagram showing an example of the functional configuration of the communication apparatus.

An example of the functional configuration of the communication apparatus 103 will be described next with reference to FIG. 3. The communication apparatus 103 includes, for example, a signal transmitting unit 301, a signal receiving unit 302, a data storage unit 303, a display control unit 304, an RRC state control unit 305, a timer unit 307, a synchronization processing unit 308, a synchronization error obtaining unit 309, and a synchronization interval setting unit 310. Note that the RRC state control unit 305 includes an RRC Resume Request transmitting unit 306. These functional units can be implemented by, for example, the control unit 201 executing programs stored in the storage unit 202 and by the control unit 201 cooperating with the wireless communication unit 204 as needed. However, the present invention is not limited to this, and, for example, at least one of the above-described functional units may be implemented by, for example, only the wireless communication unit 204, or may be implemented by dedicated hardware in another example.

The signal transmitting unit 301 and the signal receiving unit 302 transmit/receive signals to/from a partner apparatus (for example, the base station 102) of communication in accordance with definition of the 3GPP standard. The data storage unit 303 stores and holds software to be executed by the communication apparatus 103 and information such as authentication information. The display control unit 304 performs control to cause the display unit 205 to execute output such as screen display or audio output. The RRC state control unit 305 performs control for transition to each of the RRC_Idle state, the RRC_Inactive state, and the RRC_Connected state. The RRC Resume Request transmitting unit 306 transmits an RRC Resume Request message used by the communication apparatus 103 to request transition from the RRC_Inactive state to the RRC_Connected state from the base station 102.

The timer unit 307 performs time count to cause the communication apparatus 103 to execute a preset operation at a predetermined time or after a predetermined time elapses from activation of the timer during the operation of the communication apparatus 103 in the RRC_Inactive state. The synchronization processing unit 308 performs synchronization processing complying with the IEEE1588 standard. Note that in this embodiment, reference time information for the synchronization processing is distributed from the time server 101 at a period of 1 sec. The synchronization error obtaining unit 309 obtains an error that is the difference between the reference time obtained by the processing of the synchronization processing unit 308 and an intra-apparatus time held in the communication apparatus 103. The synchronization interval setting unit 310 sets a time interval to execute synchronization processing based on, for example, the error obtained by the synchronization error obtaining unit 309.

(Procedure of Processing)

Some examples of the procedure of processing executed by the communication apparatus 103 will be described next. The communication apparatus 103 executes synchronization processing and sets a time interval (synchronization interval) to execute the synchronization processing based on the error between a reference time and an intra-apparatus time. The communication apparatus 103 then executes processing associated with communication with the base station 102 in accordance with the synchronization interval. Processing to be described below is started when, for example, the communication apparatus 103 starts operating in a mode in which time synchronization is maintained while saving power. Alternatively, the following processing may be started when, for example, the control unit 201 detects that the following processing is not being executed in the communication apparatus 103 in a case where the communication apparatus 103 is powered on. This processing can be implemented by, for example, the control unit 201 of the communication apparatus 103 reading out a computer program stored in the storage unit 202 and executing. Note that this is merely an example, and the time synchronization processing unit 203 and the wireless communication unit 204 may execute at least a part of the following processing independently of the control of the control unit 201, or dedicated hardware configured to execute at least a part of the following processing may be used.

Processing Example 1

Figure 4:
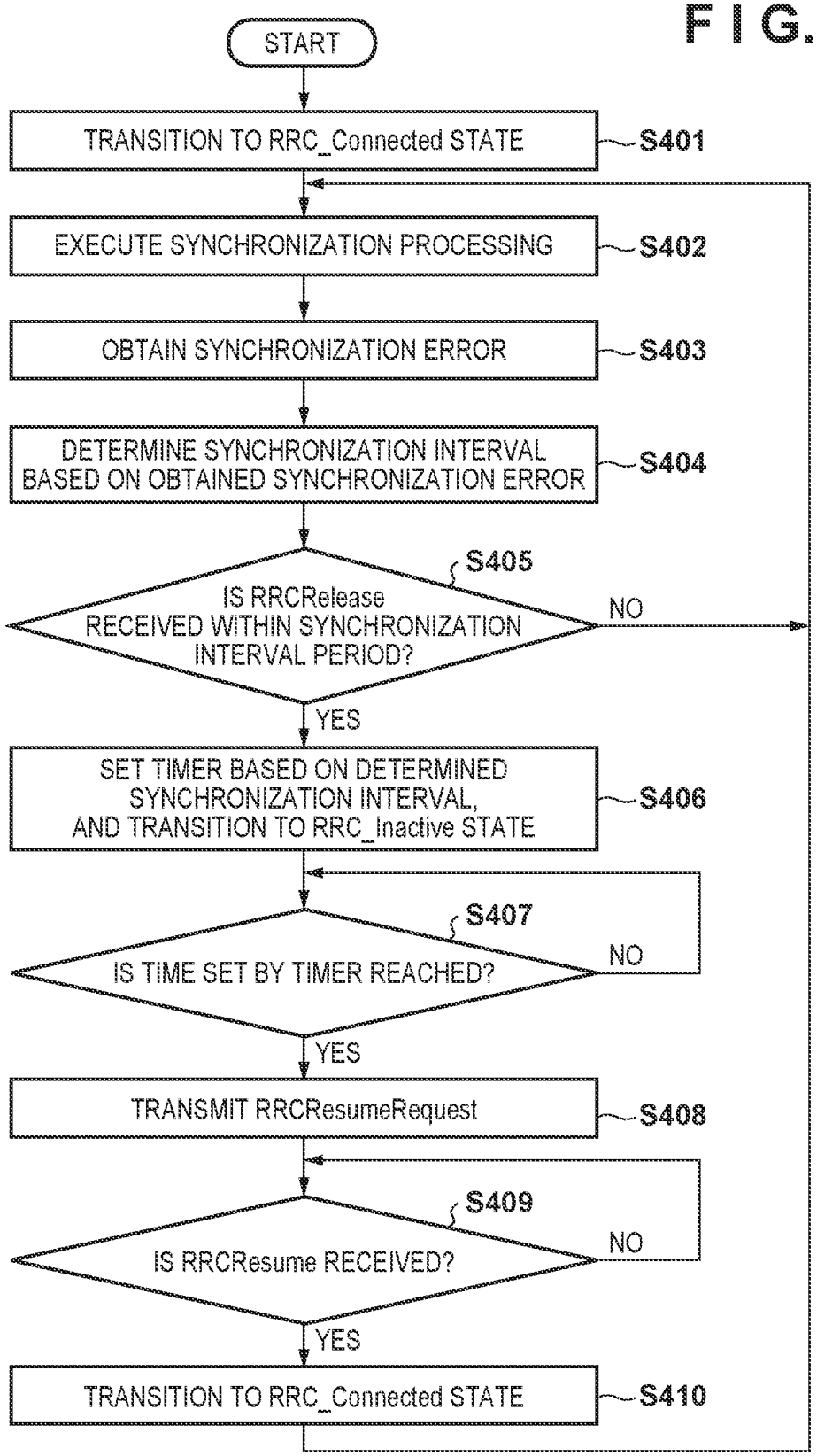
FIG. 4 is a flowchart showing the first example of the procedure of processing executed by the communication apparatus.

The first example of the procedure of processing executed by the communication apparatus 103 will be described with reference to FIG. 4. In this processing, to execute synchronization processing, the communication apparatus 103 transitions to the RRC_Connected state (step S401). Note that since the communication apparatus 103 should transition to the RRC_Connected state for location registration at least once in accordance with power-on, the process of step S401 can be executed without any special trigger. After that, using the procedure defined in the IEEE1588 standard, the communication apparatus 103 executes synchronization processing of synchronizing the intra-apparatus time with the reference time provided from the time server 101 (step S402). As the result of synchronization processing, the communication apparatus 103 obtains the error (synchronization error) between the reference time and the intra-apparatus time by, for example, error=|reference time−intra-apparatus time| (step S403). The error is represented by, for example, a value such as "5 micro second".

Based on the obtained synchronization error, the communication apparatus 103 determines the time interval (synchronization interval) from the synchronization processing executed in step S402 to synchronization processing to be executed next (step S404). For example, the smaller the error is, the longer the synchronization interval can be set by the communication apparatus 103. The larger the error is, the shorter the synchronization interval can be set by the communication apparatus 103. For example, the communication apparatus 103 may hold a correspondence table as shown in FIG. 5 in advance and select a synchronization interval corresponding to the magnitude of the error. Note that this is merely an example, and, for example, if the error is larger than a predetermined value, the situation of the communication line is assumed to be poor. Hence, the synchronization interval may be made long. That is, for example, the larger the error is, the longer the synchronization interval may be set. In addition, for example, up to an error of a predetermined value of, for example, 30 μs, the larger the error is, the shorter the synchronization interval may be set, as indicated by the correspondence relationship between the error and the synchronization interval in FIG. 5. On the other hand, if a large error of the predetermined value or more exists, the synchronization interval may be set longer. That is, the synchronization interval in a case where a large error of a predetermined value or more exists can be set to, for example, an arbitrary value longer by 15 μs or more than the synchronization interval in a case where the error is smaller than the predetermined value. For example, the synchronization interval in a case where a large error of a predetermined value or more exists can be set to be, for example, equal to or longer than the synchronization interval in a case where the error is less than 5 μs. Note that the numerical values shown in FIG. 5 are merely examples, and, for example, other values may be used based on the error of time synchronization requested in a service executed by the communication apparatus 103.

After that, the communication apparatus 103 determines whether RRCRelease (including suspendConfig) is received within the synchronization interval period determined in step S404 (step S405). The RRCRelease is an instruction message transmitted from the base station 102 (radio access network (RAN)) to cause the communication apparatus 103 to transition from the RRC_Connected state to the RRC_Inactive state. If the above-described RRCRelease message is not received within the synchronization interval period (NO in step S405), the RRC_Connected state is maintained, and therefore, the communication apparatus 103 directly executes the next synchronization processing (step S402). On the other hand, if the above-described RRCRelease message is received within the synchronization interval period (YES in step S405), the communication apparatus 103 sets the timer based on the synchronization interval period determined in step S404 and transitions to the RRC_Inactive state (step S406). As will be described later, the communication apparatus 103 operates to transition from the RRC_Inactive state to the RRC_Connected state to execute synchronization processing at the timing set by the timer. Note that the timer may be set by a detailed date/time such as "2020/01/02/03:04:56.789", or may be set by a relative time such as "0.789 sec after". The set value of the timer by the relative time can correspond to a time length in which the communication apparatus 103 should operate in a non-connected state (for example, the RRC_Inactive state). That is, the timer can be set to start time count at the timing of transition to the RRC_Inactive state and end at a timing when processing for transition to the RRC_Connected state should be started. Note that this is an example, and time count may be started at the RRCRelease reception timing, or may be started after completion of synchronization processing. The set value of the timer is determined such that the communication apparatus 103 stays in a state in which synchronization processing can be executed at the timing determined by the synchronization interval That is, the set value of the timer is determined such that the communication apparatus 103 completes transition to the RRC_Connected state at the timing when synchronization processing should be executed. Note that the set value of the timer here can be determined in consideration of the influence of an error such that time count ends at a timing earlier by a predetermined time than the time at which reference time information is assumed to be distributed. In addition, the communication apparatus 103 can determine the set value of the timer based on the arrival interval and the arrival time of a signal associated with synchronization, the RRCRelease reception time, the time until transition to the RRC_Connected state after the transmission of an RRCResumeRequest to be described later, and the like.

When it reaches the timing set by the timer (YES in step S407), the communication apparatus 103 transmits RRCResumeRequest (step S408). The RRCResumeRequest is a message used by the communication apparatus 103 operating in the RRC_Inactive state to request the base station 102 (RAN) to transition to the RRC_Connected state. After the transmission of the RRCResumeRequest, the communication apparatus 103 waits for reception of RRCResume from the base station 102 (step S409). Upon receiving RRCResume (YES in step S409), the communication apparatus 103 transitions to the RRC_Connected state (step S410) and returns the process to step S402 to execute synchronization processing.

With the above-described processing, in accordance with the time synchronization error, the communication apparatus 103 can appropriately set the reception interval of the time synchronization signal and execute time synchronization processing. That is, according to this processing example, the connected state is controlled on the side of the base station 102, and an electronic device such as the communication apparatus 103 that is not in an always connected state can execute time synchronization at an appropriate timing. According to this, the communication apparatus 103 can efficiently execute time synchronization processing and suppress power consumption by, for example, refraining from unnecessarily performing time synchronization processing.

Note that in the above-described processing, an example in which the communication apparatus 103 transmits RRCResumeRequest and transitions to the RRC_Connected state has been described. However, the communication apparatus 103 may transition to the RRC_Connected state in response to a request from the network side. That is, if data to be transmitted to the communication apparatus 103 exists, the base station 102 can transmit a paging message to cause the communication apparatus 103 to transition to the RRC_Connected state. In this case, in response to the paging message, the communication apparatus 103 can transmit RRCResumeRequest, transition to the RRC_Connected state, and return to step S402 to execute time synchronization processing. In this case, in accordance with the transition to the RRC_Connected state, the communication apparatus 103 can clear the timer and stop time counting in step S407. Alternatively, the communication apparatus 103 may wait for arrival of the timing set in step S407 without transmitting RRCResumeRequest in response to the paging message, and transmit RRCResumeRequest at that timing. In this case, at the time of transition to the RRC_Connected state, the communication apparatus 103 can receive data that has caused the paging message. According to this, since the time of the operation in the RRC_Connected state can be reduced, the communication apparatus 103 can suppress power consumption.

Processing Example 2

Figure 6B:
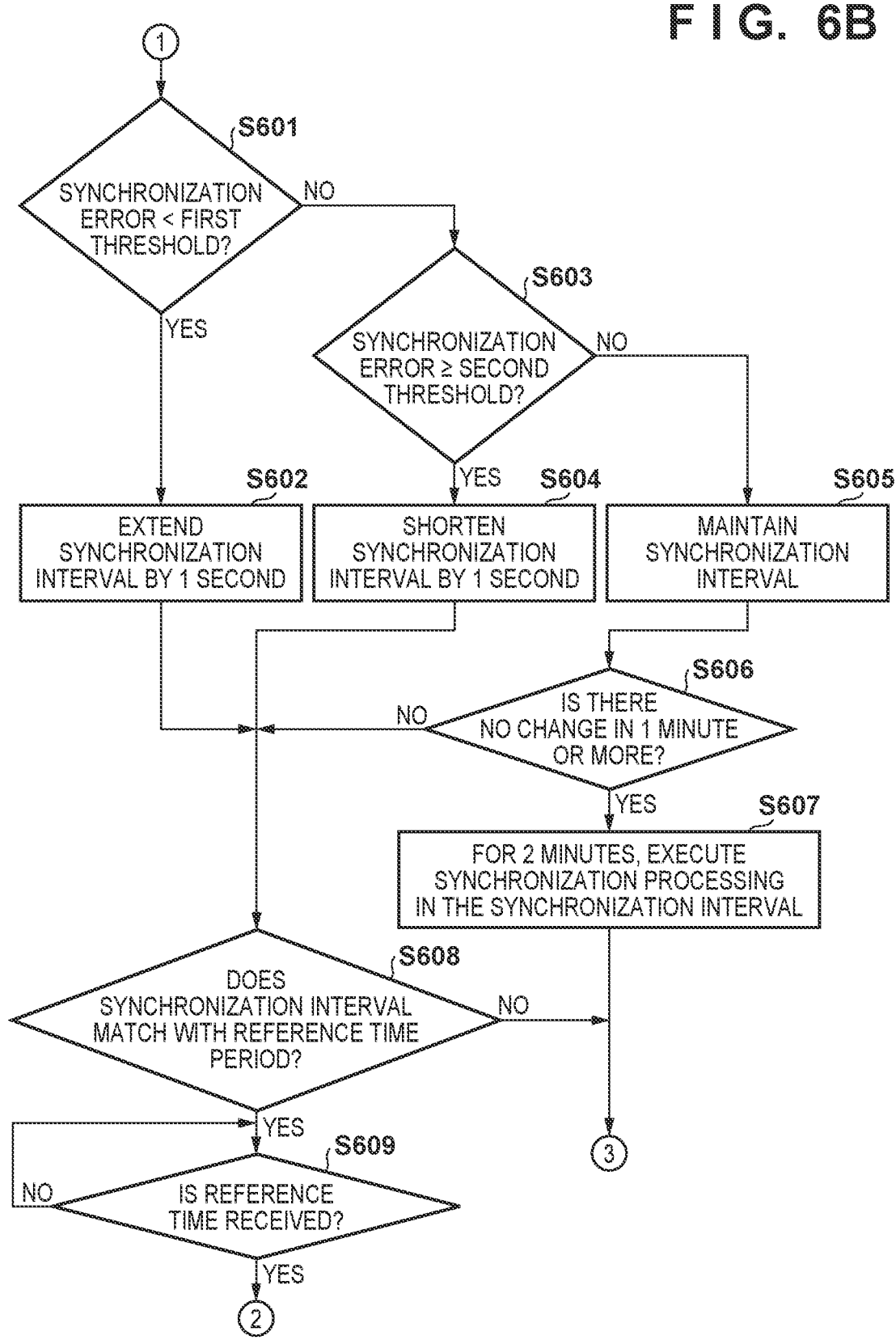

The second example of the procedure of processing executed by the communication apparatus 103 will be described next with reference to FIGS. 6A and 6B. Note that the same step numbers as in the processing shown in FIG. 4 denote the same processes, and a description thereof will be omitted. In Processing Example 1, the value of a synchronization error and a synchronization interval are associated, and the value of the synchronization interval corresponding to the value of the synchronization error is used. In this processing example, the value of the synchronization interval is adaptively changed in accordance with the value of the synchronization error. Note that the communication apparatus 103 may execute initial synchronization interval setting as in Processing Example 1 described above, and then execute processing as in Processing Example 2.

In this processing example, the communication apparatus 103 determines whether the synchronization error obtained in step S403 is less than a first threshold (step S601), or whether the synchronization error is equal to or more than the first threshold and less than a second threshold, or equal to or more than the second threshold (step S603). Note that the second threshold is a value larger than the first threshold. For example, the first threshold is 5 μs, and the second threshold is 15 μs. If the synchronization error is less than the first threshold (YES in step S601), the communication apparatus 103 extends the synchronization interval by 1 sec (step S602). If the synchronization error is equal to or more than the second threshold (YES in step S603), the communication apparatus 103 shortens the synchronization interval by 1 sec (step S604). On the other hand, if the synchronization error is equal to or more than the first threshold and less than the second threshold (NO in step S601 and NO in step S603), the communication apparatus 103 maintains the synchronization interval without changing (step S605). For example, if the synchronization error is less than 5 μs, the communication apparatus 103 extends the synchronization interval by 1 sec. If the synchronization error is 15 μs or more, the communication apparatus 103 shortens the synchronization interval by 1 sec. If the synchronization error is 5 μs or more and less than 15 μs, the communication apparatus 103 maintains the synchronization interval without changing.

Upon determining to maintain the synchronization interval in step S605, the communication apparatus 103 determines whether the synchronization interval changes in a first predetermined period such as 1 min (step S606). If the synchronization interval does not change in the first predetermined period or more (YES in step S606), the communication apparatus 103 can then determine to maintain the synchronization interval for a second predetermined period such as 2 min (step S607). In this way, if the determined synchronization interval is stable, the communication apparatus 103 can execute synchronization processing for the second predetermined period without executing the processes of steps S608 and S609 to be described later. Note that in this case, the communication apparatus 103 executes processing such as transition to the RRC_Connected state and executes synchronization processing in accordance with the maintained synchronization interval. That is, the communication apparatus 103, for example, advances the process to step S405 and executes synchronization processing in step S402 after the processes of steps S406 to S410. In the second predetermined period, after the synchronization processing in step S402, the communication apparatus 103 does not perform processing such as synchronization error obtaining in step S403 or determination in steps S601 and S603 and can immediately advance the process to step S405. This can suppress the power consumption of the communication apparatus 103 because operations for determination in steps S601 and S603 need not be performed.

If the synchronization interval is changed in step S602 or S604, or if the synchronization interval is maintained in step S605 but changes in the first predetermined period (NO in step S606), the communication apparatus 103 advances the process to step S608. In step S608, the communication apparatus 103 determines whether the determined synchronization interval matches the distribution period of the reference time information (for example, 1 sec), that is, whether the synchronization interval is set to receive all pieces of distributed reference time information. If the determined synchronization interval matches the distribution period of the reference time information (YES in step S608), the communication apparatus 103 waits for reception of the reference time information without transitioning to the RRC_Inactive state (step S609). Note that it has been described that if the synchronization interval matches the distribution period of the reference time information, the communication apparatus 103 maintains the RRC_Inactive state. However, the present invention is not limited to this. That is, if the synchronization interval is shorter than a predetermined time length (for example, 3 sec), the communication apparatus 103 may maintain the RRC_Inactive state. After that, if reference time information is received (YES in step S609), the communication apparatus 103 returns the process to step S402 to execute synchronization processing. Note that since transition to the RRC_Inactive state does not occur, for example, the communication apparatus 103 may notify, for example by transmitting an uplink scheduling request, the base station 102 that the state in which communication should be performed is maintained. This can prevent the communication apparatus 103 from excessively repeating state transition between the RRC_Inactive state and the RRC_Connected state. On the other hand, if the determined synchronization interval does not match the reference time information notification period (NO in step S608), the communication apparatus 103 operates as in Processing Example 1 from then on, including transition to the RRC_Inactive state.

Note that in step S602, if the maximum time length of the synchronization interval is set, the synchronization interval can be inhibited from being extended beyond the maximum time length. For example, if the maximum time length of the synchronization interval is set to 15 sec, the synchronization interval is inhibited from being extended to be longer than 15 sec. Similarly, in step S604, if the minimum time length of the synchronization interval is set, the synchronization interval can be inhibited from being shortened beyond the minimum time length. For example, if the minimum time length of the synchronization interval is set to 1 sec, the synchronization interval is shortened such that the synchronization interval does not become less than 1 sec. Also, for example, as in step S606 described above, if the synchronization interval is not extended for the first predetermined period (for example, 1 min) due to the restriction of the maximum time length in step S602, the synchronization interval may be maintained in the second predetermined period (for example, 2 min) after that. Similarly, if the synchronization interval is not shortened for the first predetermined period (for example, 1 min) due to the restriction of the minimum time length in step S604, the synchronization interval may be maintained in the second predetermined period (for example, 2 min) after that.

In Processing Example 2, the synchronization interval can adaptively be set in seconds by the above-described processing. For this reason, a synchronization interval suitable for a situation can appropriately be set in accordance with the value of the synchronization error. Note that the synchronization interval in each of the above-described processing examples is set to a multiple of the distribution period of the reference time information. That is, in the above-described examples, the distribution period of the reference time information is 1 sec. Hence, in Processing Example 1, a synchronization interval of 1 sec, 3 sec, or 10 sec is used. In Processing Example 2, the synchronization interval is extended or shortened in seconds. With this, the communication apparatus 103 can transition to the RRC_Connected state at an appropriate timing to execute time synchronization processing. Even in a case where the distribution period of the reference time information is not 1 sec, when the length of the synchronization interval is set to a multiple of the distribution period, the communication apparatus 103 can reliably execute time synchronization processing.

Note that in the above-described examples, an example in which the communication apparatus 103 is made to transition to the RRC_Inactive state has been described. Similar processing can be used when making the communication apparatus 103 transition to the RRC_Idle state. In this case, assuming that the time until connection is established becomes long as compared to a case where transition to the RRC_Inactive state occurs, the communication apparatus 103 specifies the timing of starting processing for transition to the RRC_Connected state and sets the value of the timer. Note that the communication apparatus 103 can specify the frequency/time resource for transmission of a random access (RA) preamble based on a notification signal received from the base station 102. Considering the time needed for Resume processing in the network, the communication apparatus 103 can set the timer such that the RA preamble is transmitted in such a timing resource that enables transition to the RRC_Connected state just in time for synchronization processing.

Note that in the above-described embodiment, a case where the communication apparatus 103 is a terminal apparatus of a cellular communication system has been described. This is merely an example, and processing as described above can be performed by another communication apparatus. That is, a communication apparatus for performing wireless communication by switching between the connected state and the non-connected state under the control of a control apparatus such as the base station 102 transmits a request to the control apparatus such that the communication apparatus stays in the connected state in accordance with a time interval for executing synchronization processing. Note that the communication apparatus may notify the control apparatus such as the base station of the information of the synchronization interval and cause the base station to transmit a transition instruction to the connected state at a timing according to the synchronization interval (for example, by paging). Also, the communication apparatus may transmit the information of the error to the control apparatus, and the control apparatus may determine the communication apparatus and cause the communication apparatus to transition to the connected state in accordance with the determined synchronization interval. As described above, the communication apparatus can determine the synchronization interval alone in the self-apparatus without notifying the base station or the like of the information of the error and transmit a message for transition to the connected state at a timing according to the determination, but may cause the control apparatus such as the base station to perform a part of the operation.

According to the present invention, a communication apparatus that is not in an always connected state can efficiently establish time synchronization.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)$^T$M), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-119870, filed Jul. 20, 2021, which is hereby incorporated by reference herein in its entirety.

What is claimed is:

1. A communication apparatus for performing wireless communication by switching between a connected state in which connection is established and a non-connected state in which connection is not established based on control of a base station, comprising:
   one or more processors; and
   one or more memories that store a program for causing, when executed by the one or more processors, the communication apparatus to:
   perform, during establishment of connection with the base station, synchronization processing for obtaining reference time information of a time synchronization system and establishing time synchronization;
   set a time interval for performing the synchronization processing based on an error of an intra-apparatus time held in the communication apparatus with respect to time information represented by the reference time information; and
   in a case where the communication apparatus is operating in the non-connected state, based on the time interval, request the base station to cause the communication apparatus to stay in the connected state at a timing when the synchronization processing is to be performed,
   wherein the synchronization processing is performed at a timing based on the time interval, at which the communication apparatus is operating in the connected state.

2. A control method executed by a communication apparatus for performing wireless communication by switching between a connected state in which connection is established and a non-connected state in which connection is not established based on control of a base station, comprising:
   performing, during establishment of connection with the base station, synchronization processing for obtaining reference time information of a time synchronization system and establishing time synchronization;
   setting a time interval for performing the synchronization processing based on an error of an intra-apparatus time held in the communication apparatus with respect to time information represented by the reference time information; and
   in a case where the communication apparatus is operating in the non-connected state, based on the time interval, requesting the base station to cause the communication apparatus to stay in the connected state at a timing when the synchronization processing is to be performed,
   wherein the communication apparatus performs the synchronization processing at a timing based on the time interval, at which the communication apparatus is operating in the connected state.

3. The method according to claim 2, wherein in a case where the communication apparatus is operating in the connected state at the timing at which the synchronization processing is to be performed, the synchronization processing is executed without making the request.

4. The method according to claim 2, wherein
the communication apparatus holds information for making a magnitude of the error correspond to the time interval, and
in the setting, the time interval is selected and set based on the magnitude of the error and the information.

5. The method according to claim 2, wherein
in the setting, the time interval is adaptively extended, maintained, or shortened based on the magnitude of the error.

6. The method according to claim 5, wherein
in the setting, in a case where the magnitude of the error is less than a first threshold, the time interval is extended, and in a case where the magnitude of the error is not less than a second threshold, the time interval is shortened.

7. The method according to claim 5, wherein
in the setting, in a second predetermined period after it is determined, in a state in which the time interval is maintained for a first predetermined period, to maintain the time interval, the time interval is maintained independently of the magnitude of the error.

8. The method according to claim 2, further comprising determining, based on the time interval, whether to transition to the non-connected state after the synchronization processing is performed in the connected state.

9. The method according to claim 8, wherein
in a case where a distribution period of the reference time information matches the time interval, it is determined not to transition to the non-connected state after the synchronization processing is performed.

10. The method according to claim 8, wherein
in a case where a distribution period of the reference time information is shorter than a predetermined time length, it is determined not to transition to the non-connected state after the synchronization processing is performed.

11. The method according to claim 2, further comprising determining a timing for making the request based on the time interval and a time after the request to the base station is made until the communication apparatus transitions to the connected state under the control of the base station.

12. The method according to claim 2, wherein
the request is made in accordance with completion of a timer configured to count a time length in which the communication apparatus is to stay in the non-connected state.

13. The method according to claim 2, further comprising
in a case where a message representing that the communication apparatus is to transition to the connected state should occur is received from the base station during the non-connected state, transitioning to the connected state by making the request without responding to the message.

14. A non-transitory computer-readable storage medium that stores a program configured to cause a computer included in a communication apparatus for performing wireless communication by switching between a connected state in which connection is established and a non-connected state in which connection is not established based on control of a base station to:
perform, during establishment of connection with the base station, synchronization processing for obtaining reference time information of a time synchronization system and establishing time synchronization;
set a time interval for performing the synchronization processing based on an error of an intra-apparatus time held in the communication apparatus with respect to time information represented by the reference time information; and
in a case where the communication apparatus is operating in the non-connected state, based on the time interval, request the base station to cause the communication apparatus to stay in the connected state at a timing when the synchronization processing should be performed,
wherein the communication apparatus performs the synchronization processing at a timing based on the time interval, at which the communication apparatus is operating in the connected state.

* * * * *